(12) United States Patent
Hobbs et al.

(10) Patent No.: US 10,926,243 B2
(45) Date of Patent: Feb. 23, 2021

(54) HIGHLY POROUS LUBRICANT CONDITIONING AND REMEDIATION MEDIA

(71) Applicant: 1441413 Alberta Inc., Calgary (CA)

(72) Inventors: Matthew Hobbs, Calgary (CA); Peter T Dufresne, Calgary (CA)

(73) Assignee: 1441413 Albertra Inc.

( * ) Notice: Subject to any disclaimer, the term of this patent is extended or adjusted under 35 U.S.C. 154(b) by 0 days.

(21) Appl. No.: 16/539,610

(22) Filed: Aug. 13, 2019

(65) Prior Publication Data

US 2020/0055021 A1   Feb. 20, 2020

Related U.S. Application Data

(60) Provisional application No. 62/718,638, filed on Aug. 14, 2018.

(51) Int. Cl.
| | |
|---|---|
| *B01J 20/26* | (2006.01) |
| *B01J 20/28* | (2006.01) |
| *C10M 175/00* | (2006.01) |
| *C10M 105/74* | (2006.01) |

(Continued)

(52) U.S. Cl.
CPC .......... *B01J 20/267* (2013.01); *B01D 15/361* (2013.01); *B01J 20/261* (2013.01); *B01J 20/262* (2013.01); *B01J 20/28004* (2013.01); *B01J 20/28016* (2013.01); *B01J 20/28085* (2013.01); *C09K 5/20* (2013.01); *C10M 105/74* (2013.01); *C10M 175/0008* (2013.01); *C10M 175/0075* (2013.01); *C10M 2223/0405* (2013.01)

(58) Field of Classification Search
CPC ..... B01D 15/361; B01J 20/261; B01J 20/262; B01J 20/267; B01J 20/28004; B01J 20/28016; B01J 20/28085; C09K 5/20; C10M 105/74; C10M 175/0008; C10M 175/0058; C10M 175/0075; C10M 175/06; C10M 2223/003; C10M 2223/0405
See application file for complete search history.

(56) References Cited

U.S. PATENT DOCUMENTS

| | | | | |
|---|---|---|---|---|
| 4,045,330 A | * | 8/1977 | Avrillon | C10M 175/06 208/180 |
| 2008/0237133 A1 | * | 10/2008 | Dale | C08J 9/26 210/660 |
| 2009/0001023 A1 | * | 1/2009 | Dufresne | B01D 15/00 210/692 |

FOREIGN PATENT DOCUMENTS

| | | | |
|---|---|---|---|
| JP | 63289062 A | * 11/1988 | |
| WO | WO-2017178593 A2 | * 10/2017 | B01J 20/267 |

* cited by examiner

*Primary Examiner* — James C Goloboy
(74) *Attorney, Agent, or Firm* — Barbara E Johnson, Esq.

(57) ABSTRACT

The present invention is a solid lubricant treatment medium, usually but not always in bead form, suitable to be brought into contact with lubricants to remediate and to condition them. A key feature of the medium, typically a polymeric resin, is the presence of relatively very large pores, which are able to capture and remove fine lubricant contaminants and breakdown products (such as small phosphate ester varnish, soot, coke, dissolved metal or other small semi-soluble or insoluble particles). Resins and adsorbents of the prior art have proven unable to remove fine contaminants like phosphate ester varnish that have a deleterious impact on industrial equipment performance and reliability. The mean pore size diameter of the medium is between about 8,000 Å and 100,000 Å and, more preferably, in the range of about 20,000 Å to about 80,000 Å.

4 Claims, 3 Drawing Sheets

(51) Int. Cl.
*B01D 15/36* (2006.01)
*C09K 5/20* (2006.01)

HIGHLY POROUS LUBRICANT CONDITIONING AND REMEDIATION MEDIA

This patent application claims priority to, and incorporates herein by reference, U.S. Provisional Application for Patent No. 62/718,638, filed 14 Aug. 2018.

FIELD OF THE INVENTION

The present invention is a solid and unusually porous medium for use in conditioning or remediating industrial lubricants.

BACKGROUND OF THE INVENTION

The efficient and reliable operation of critical industrial equipment relies upon the use of lubricants or other functional fluids. Industrial lubricants (including lubricating oils, hydraulic fluids, phosphate ester-based control oils), however, are subject to degradation and contamination during service, impairing their ability to fulfill their duties effectively. These lubricants must, therefore, be maintained in acceptable condition to ensure that critical equipment performs reliably. When lubricating fluids are not kept in acceptable condition, costly equipment failure and downtime may result. Successful maintenance strategies must, therefore, provide a means of identifying and addressing the accumulation of deleterious lubricant contaminants and degradation products that occurs during service. Oil analysis and a variety of filtration or conditioning systems are generally used to monitor and maintain lubricant condition, respectively.

Contamination and degradation during lubricant service is inevitable. Insoluble particles, water and gases are common contaminants in non-aqueous lubricants, and their deleterious impact on equipment performance and reliability is well-established. Lubricant degradation occurs via numerous pathways including oxidation, hydrolysis and thermolysis. The breakdown products arising from degradation are often acidic and may themselves be poorly soluble or insoluble in the lubricant. Even when breakdown products, initially, remain soluble in the lubricant, they may undergo further reactions with other breakdown products and contaminants to produce insoluble particles or deposits generally referred to as "varnish." Regardless of origin, all of these lubricant contaminants and degradation products have a negative impact on equipment performance and reliability.

Because of their effect on equipment reliability and performance, lubricant contaminant and degradation levels are generally monitored using oil analysis. Common test methods include (but are not limited to): particle counting, moisture analysis, spectroscopy, analysis of physical properties (viscosity, density etc.) and membrane patch colorimetry (MPC). The latter test is intended to gauge "varnish potential" in turbine lubricating oils. The present authors have recently developed an improved MPC methodology that may be used to evaluate "varnish potential" in phosphate ester-based synthetic lubricants. Phosphate esters are ubiquitous control fluids employed in a variety of critical industrial applications. While phosphate ester particle, water and acid levels are routinely monitored to ensure equipment performance and reliability, their "varnish potential" has, heretofore, been generally absent from oil analysis programs. As is well-established in turbine lubricating oils, varnish particles or deposits may lead to costly failures and downtime in critical industrial systems which employ phosphate ester control fluids.

After deleterious lubricant contaminants and degradation products have been identified by oil analysis, they must be addressed by filtration or conditioning systems to ensure that critical equipment performs as intended. In this regard, prior art includes drying systems, electrostatic precipitation/filtration systems, mechanical filtration systems, adsorbents and treatment systems employing solid ion exchange media of, relatively, limited porosity. The latter are used to remove acidic degradation products from phosphate ester lubricants and their utility in this regard was disclosed in U.S. Published Patent Application No. 2009/0001023 to Dufresne (hereinafter "the Dufresne published patent application.) These ion exchange resins contain relatively small pores to increase the solid media's surface area available for acid-removal. Phosphate ester water, particle and acid levels have been effectively managed for many years using the above-discussed prior art. Phosphate ester varnish cannot, however, be effectively addressed using these previously disclosed technologies. With the advent and disclosure of improved phosphate ester "varnish potential" testing, the extent of phosphate ester varnish problems has become obvious and the root cause of many costly industrial failures has been linked to fine varnish particles and deposits produced via phosphate ester degradation. Prior to the present invention, a need, therefore, remained to develop lubricant filtration, treatment or conditioning systems able to remove harmful phosphate ester varnish from phosphate ester lubricants and analogous contaminants from other industrial lubricants of a generally similar nature.

SUMMARY OF THE INVENTION

In order to meet this need, the present invention is a lubricant filtration and conditioning system which uses ion exchange resin in which the pore size of at least some of the resin is significantly (on the order of twenty times) greater than the pores of prior art filters and resins. The use of ion exchange resins featuring unusually large pores was, heretofore, counterintuitive since their large pore volume limits the surface area available for ion exchange/acid-removal. As a result, the ion exchange resins of the present invention are inefficient acid scavengers relative to those of the prior art. Ion exchange resins featuring unusually large pore sizes are surprisingly able to capture and retain extremely fine (smaller than 4 µm in diameter) particles (including phosphate ester varnish) from lubricants. The ion exchange resin's unusually large pores may also be able to capture and retain ultrafine soot or coke particles which generally result from thermolytic lubricant breakdown. Moreover, the porous ion exchange resins of the present invention can capture, retain and remove these fine insoluble contaminants and breakdown products (varnish, soot, coke etc.) in a way that conventional mechanical filtration media having the same interstitial dimensions (1-4 µm, for instance) cannot. On this basis, the present large-pore ion exchange resins do not function as simple sieves. This suggests that the three-dimensionally highly porous structure of the polymer ion exchange resin medium plays a significant role in the efficient capture and retention of fine insoluble lubricant contaminants and breakdown products. By using the present invention, the risk of lubricant condition-related costly industrial equipment failures can be effectively mitigated.

More particularly, the present invention comprises an unusually porous ion exchange resin for use in lubricant remediation and conditioning. The unusually porous ion exchange resins of the present invention typically take the form of macroporous polymer beads having a bead size of 300-1,500 μm. The lubricant oil is brought into contact with the inventive ion exchange resins either during cleaning periods or while the oil is in-service. The pores of the present ion exchange resins are on the order of twenty times larger than the typical median pore sizes of ion exchange resins already known in the art (as measured by mercury porosimetry). For example, typical prior art resin beads have median pore sizes of on the order of 400-900 Å, whereas the present invention large-pore ion exchange resins have median pore sizes on the order of 8,000 Å (twenty times 400 Å), 10,000 Å (twenty times 500 Å), 18,000 Å (twenty times 900 Å), 20,000 Å, 40,000 Å or even up to 60,000-100,000 Å. Often, the present invention's median pore size will be selected from within the range of 20,000-80,000 Å. The inventors also believe that ion exchange resins featuring a median pore size between 8,000-100,000 Å will give new and unexpectedly improved lubricant contaminant and breakdown product removal results compared with resins having smaller (or, ostensibly, larger) pores than those within that stated range.

DETAILED DESCRIPTION OF THE INVENTION

Figure 1:
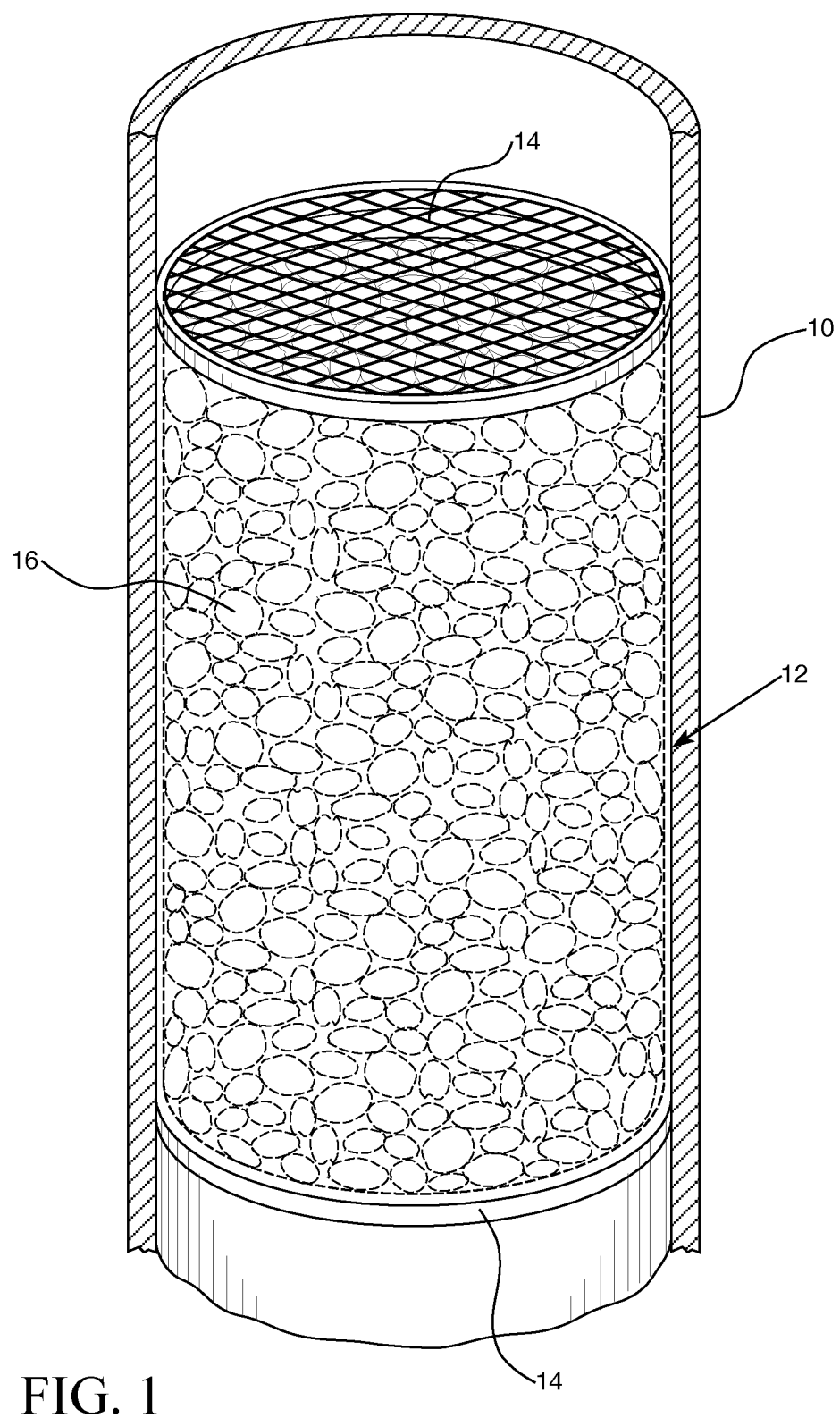
FIG. 1. is a sectional view of an array configured for axial flow.

The present inventive ion exchange resins feature unusually large pore sizes, allowing for the, heretofore, impossible capture of fine lubricant contaminants and breakdown products (phosphate ester varnish, soot, coke etc.). These lubricant contaminants and degradation products are typically less than 4 μm in size and, therefore, difficult or impossible to remove via sieve-type techniques described within the prior art. By using ion exchange resins with pore sizes on the order of twenty times greater than those described throughout the prior art, the present inventive resins allow for the efficient removal of fine lubricant contaminants and breakdown products. These deleterious species enter the relatively larger pores of the inventive ion exchange resins where they are then captured and retained. Typical polymer resins meant for use in the present invention are (without limitation): polystyrene (including cross-linked polystyrenes), polyurethane, epoxy, polyvinyl, vinyl ester, divinylbenzene or acrylic resins of virtually any type as long as they are polymers in the generally understood plastic family. These polymeric resins may be functionalized to form anionic or cationic exchange resins or the polymer may remain unfunctionalized. The use of functionalized anion or cation exchange resins may, however, enhance the solid medium's ability to remove other undesirable contaminants and breakdown products (acids, metals etc.) from lubricants.

Given the above explanation of how the "larger pore" inventive resins capture fine insoluble phosphate ester lubricant varnish particles etc., the inventors' motivations for employing the unusually porous inventive resins might seem apparent. The use of these relatively large pore-containing ion exchange resins was, however, utterly counterintuitive. Since the ion exchange resins described in the prior art are intended to remove acidic lubricant breakdown products, one skilled in the art of lubricant treatment would select a resin having a high exchange (acid-removal) capacity. Ion exchange resins with many, smaller pores feature more surface area and, therefore, offer inherently greater acid-removal abilities. Intuitively, one skilled in the art of lubricant treatment would also select an ion exchange resin with smaller pores and greater surface area to maximize the treatment medium's adsorbing capacity to remove varnish. By drastically increasing the median pore sizes in the present ion exchange resins, the inventors have acted in complete contradiction with this established wisdom, and have accordingly overwhelmingly reduced the inventive ion exchange resin's surface areas. This counterintuitive significant (on the order of twenty times) increase in ion exchange resin pore size has, nevertheless, led to novel and surprisingly improved results to treat the, heretofore, unappreciated and unsolved problem of fine lubricant contaminants and breakdown products (varnish, soot, coke, etc.).

The present invention focuses on the, heretofore, difficult or impossible removal of fine lubricant contaminants and breakdown products (varnish, soot, coke etc.) at the expense of the inventive media's acid-removal capabilities. The prior art necessity of acid-removal, however, remains important. Fortunately, it is possible to combine the present larger-pore ion exchange resins with other ion exchange resins whose pore sizes are smaller and acid-removal capacities are concomitantly greater. This combination of inventive ion exchange resin with more conventional prior art resins may be accomplished by mixing or layering two or more types of ion exchange resin beads. It is feasible to combine about 20% (w/w) of the inventive "large-pore" ion exchange resins with about 80% (w/w) of the traditional acid-scavenging ion exchange resins; it is equally tenable that the mixture or layering can be about 50% of each. After one understands the different mechanisms by which the inventive and prior art ion exchange resins work (as described herein and in the Dufresne published patent application), the choice of ratio has to do with the need for acid reduction primarily since a reduction in the amount of traditional acid-scavenging media stoichiometrically reduces the overall ion exchange resin mixture's acid-removal capacity concomitantly. As to the inventive ion exchange resins, the approximately 20% or more inclusion has been shown to be empirically adequate because the larger pores in the present invention lead to an unusually high void space which allows for the capture of significant amounts of fine lubricant contaminants and breakdown products. In systems where acids are less of a concern, the novel inventive ion-exchange resins can be used without the need to mix with prior art acid-removal resins.

Clearly, then, the inventive core is the insight into using ion exchange resins having relatively larger (on the order of twenty times) pores to trap fine lubricant contaminants and breakdown products including phosphate ester varnish (which, heretofore, was not routinely monitored but, nevertheless, led to avoidable equipment failures and downtime and premature lubricant life).

Figure 2:
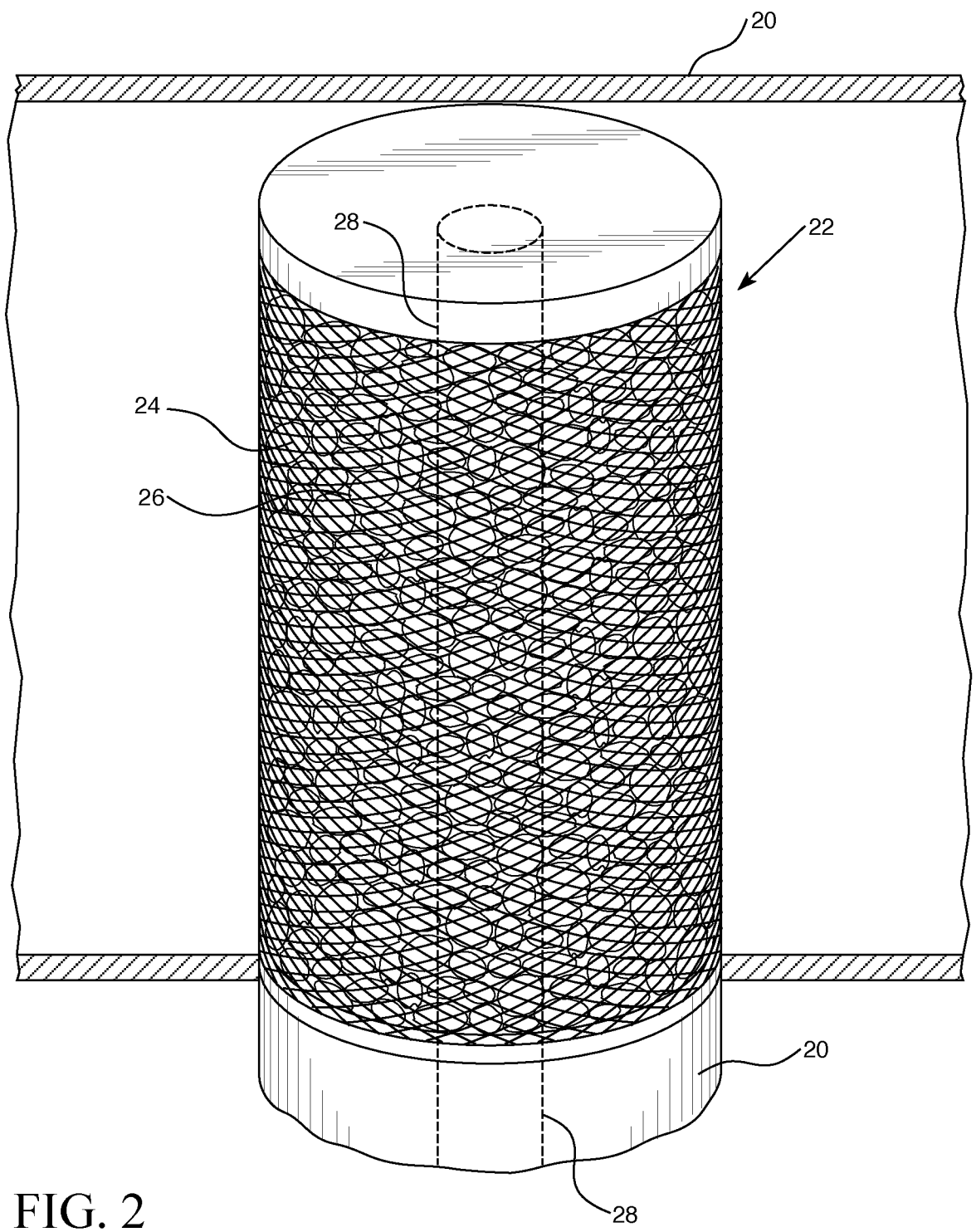
FIG. 2. is a sectional view of an array configured for radial flow.
Figure 3:
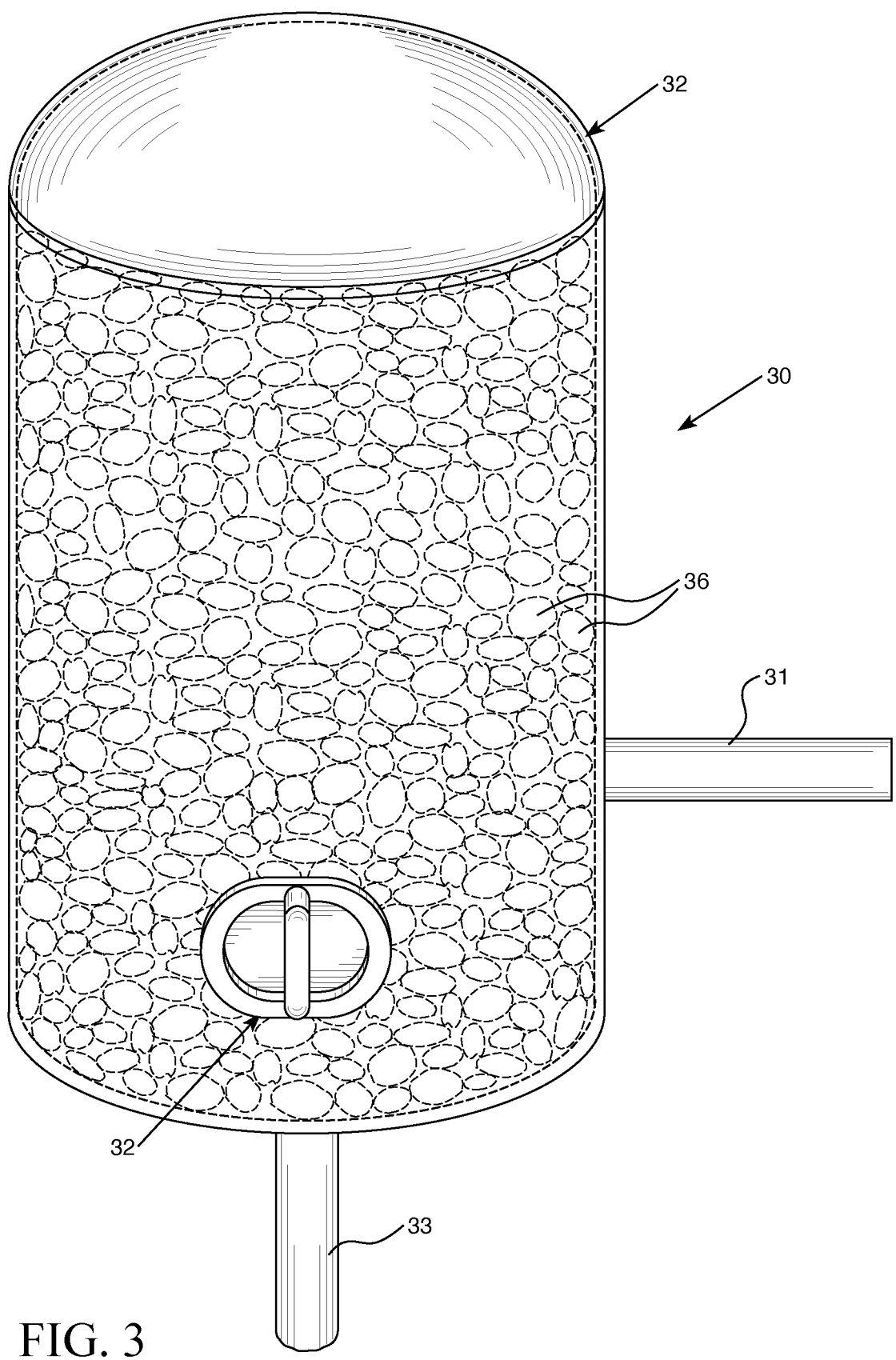
FIG. 3 is a plan view of a bulk treatment vessel containing the present medium, with an inlet and outlet for fluid flow.

Referring now to FIG. 1, a sectional view of a portion of pipe 10 typical of a cleaning loop in a lubricant system is shown in section with a cartridge 12 in place. The cartridge 12 is a section of the pipe in which two barriers 14, typically a pored screen or mesh, are positioned both upstream and downstream of a quantity of porous beads 16 of solid medium according to the invention. The beads are enlarged in the Figure for illustration purposes and therefore are not shown to scale. The pores or mesh screen holes in the barrier 14 need only to be smaller than the smallest size of the beads 16 to hold them in their position within the cartridge 12. The cartridge 12 can be removed, for replacement of the beads 16, via threaded fasteners or an equivalent means of structural integrity including press-fit, epoxy sealing, welding, robotic sealing or any other means of construction. One or more traditional particulate filters (not shown) can be added at any point along the fluid flow, and are optional. The section of pipe 10 can be placed in any convenient location in a lubricant system, preferably in a location of easy access for maintenance (replacement of the solid medium beads). Although not shown in FIG. 1, it is also beneficial to introduce a "kidney loop" format secondary to a primary filtration system or as part of a primary circulation system, especially for lubricant remediation. FIG. 2 shows an alternative configuration for radial flow, with the cartridge 22, barrier 24, beads 26, an inlet pipe 20 and an outlet pipe 28, all analogous to FIG. 1. FIG. 3 is a plan view of a bulk treatment alternative, in which a vessel 30 holds the beads 36 of the present invention, which can be charged to the container via hatch 32, with the fluid flow entering via pipe 31 and exiting via pipe 33. The vessel contains an optional domed lid hatch 32 which can be used as an alternate access point for adding or removing the present beads. Again, in none of these Figures are the beads shown to scale.

Turbine lubricant applications can contain from 400 to 20,000 gallons of lubricant, typically, or even less or more than that, and the associated media needed according to the invention increases or decreases proportionately. The amount of media needed also varies as a function of the lubricant to be treated. The types of oils that can be conditioned or remediated in the present invention (with or without the specific structures shown in FIGS. 1-3) are petroleum-based and synthetic lubricants and insulating fluids classified as API Group I, II, III, IV or V. As those skilled in the art are aware, phosphate ester-based control oils are among the non-hydrocarbon-based synthetic lubricants in API Group V. The present invention, therefore, accommodates a wide variety of media amounts and fluid systems, and those skilled in the art learning from this specification to use the disclosed media with relatively much larger pores will easily be able, without undue experimentation, to determine how much porous resin media to use and how often to replace it. Having said that, a typical installation for ester-based synthetic lubricants could include, without limitation, two cartridges 6 inches in diameter each and 18 inches in length containing the beads of the present disclosure (any of the 100% inventive beads, 50% inventive beads and 50% acid-reduction beads or other media beads, or the above-described 20% inventive beads and 80% acid-reduction or other media beads) to treat about 400 gallons of lubricant. Alternatively, a typical installation for a hydrocarbon-based turbine lubricant could include, by non-limiting example only, two resin-filled cartridges 1 foot in diameter each and 20 inches in length to treat about 6,000 gallons of lubricant. Note that, in the above examples, the ester-based synthetic lubricant installation embodied about three times more resin per lubricant volume than was used in the hydrocarbon-based lubricant.

Although the invention has been described with particularity above, the invention is only to be limited insofar as set forth in the accompanying claims.

We claim:

1. A method of cleaning a quantity of lubricant, comprising contacting all or a portion of the lubricant to be cleaned with a quantity of polymer medium having pores distributed throughout, wherein at least a portion of any insoluble lubricant contaminants and breakdown products contained in said lubricant and smaller than 4 μm are captured by said pores, said pores' further having a mean diameter of between 8,000 Å and 100,000 Å as measured by mercury porosimetry.

2. The method of claim 1, wherein said polymer medium is in the form of beads.

3. The method of claim 1, wherein said polymer medium is selected from the group consisting of polystyrene, cross-linked polystyrene, polyurethane, epoxy, polyvinyl, vinyl ester, divinylbenzene, and acrylic.

4. The method of claim 1, wherein when method steps of claim 1 are used to clean a phosphate ester-based lubricant, the membrane patch colorimetry varnish potential of a phosphate ester-based lubricant is reduced to a value of <20.0.

* * * * *